(12) United States Patent
Bodlaender et al.

(10) Patent No.: US 8,490,123 B2
(45) Date of Patent: Jul. 16, 2013

(54) METHOD AND DEVICE FOR GENERATING A USER PROFILE ON THE BASIS OF PLAYLISTS

(75) Inventors: Maarten Peter Bodlaender, Eindhoven (NL); Wilhelmus Franciscus Johannes Verhaegh, Eindhoven (NL); Arnout Michiel De Mooij, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1011 days.

(21) Appl. No.: 10/558,733

(22) PCT Filed: May 26, 2004

(86) PCT No.: PCT/IB2004/050781
§ 371 (c)(1),
(2), (4) Date: Nov. 29, 2005

(87) PCT Pub. No.: WO2004/107757
PCT Pub. Date: Dec. 9, 2004

(65) Prior Publication Data
US 2006/0242661 A1    Oct. 26, 2006

(30) Foreign Application Priority Data
Jun. 3, 2003  (EP) .................................... 03101611

(51) Int. Cl.
*H04H 60/33*    (2008.01)

(52) U.S. Cl.
USPC .................. 725/9; 725/14; 725/46; 709/203; 369/30.08; 84/600; 84/611; 84/612; 84/622

(58) Field of Classification Search
USPC ................. 725/9, 14, 46, 28, 47, 50, 93, 116, 725/146; 455/3.06, 3.02, 154.1; 705/26; 84/612; 386/46; 709/203
See application file for complete search history.

(56) References Cited

U.S. PATENT DOCUMENTS

| | | | |
|---|---|---|---|
| 5,616,876 A * | 4/1997 | Cluts ............................... | 84/609 |
| 6,041,311 A * | 3/2000 | Chislenko et al. ........... | 705/26.7 |
| 6,192,340 B1 | 2/2001 | Abecassis | |
| 6,248,946 B1 * | 6/2001 | Dwek ............................. | 84/609 |
| 6,446,080 B1 * | 9/2002 | Van Ryzin et al. .................. | 1/1 |
| 6,987,221 B2 * | 1/2006 | Platt ................................ | 84/601 |
| 7,051,352 B1 * | 5/2006 | Schaffer .......................... | 725/39 |
| 7,251,452 B2 * | 7/2007 | Stumphauzer, II .......... | 455/3.06 |

(Continued)

FOREIGN PATENT DOCUMENTS
EP    0872844 B1    5/2005

OTHER PUBLICATIONS

Aucouturier J. etal., "Scaling Up Music Playlist Generation", IEEE, vol. 1, Aug. 26, 2002, pp. 105-108, XP010604317.*

(Continued)

*Primary Examiner* — Brian Pendleton
*Assistant Examiner* — Alan Luong

(57) ABSTRACT

In a method and device for generating a user profile on the basis of playlists, the user profile is generated on the basis of the user's own playlists and properties derived from them. In this way, more playlists are considered in the generation of a user profile, thereby generating a more reliable user profile. Aspects taken into account includes frequency of occurrence, creation date of the playlist, and relation between content items (songs, video, etc.) in one or more playlists.

19 Claims, 1 Drawing Sheet

U.S. PATENT DOCUMENTS

| | | | | |
|---|---|---|---|---|
| 2001/0018858 A1* | 9/2001 | Dwek | ............................ | 84/609 |
| 2002/0037083 A1* | 3/2002 | Weare et al. | .................... | 381/58 |
| 2002/0040326 A1* | 4/2002 | Spratt | ............................ | 705/26 |
| 2002/0120925 A1* | 8/2002 | Logan | ............................ | 725/9 |
| 2002/0152278 A1* | 10/2002 | Pontenzone et al. | .......... | 709/217 |
| 2003/0051095 A1* | 3/2003 | Artigalas et al. | ............. | 711/111 |

OTHER PUBLICATIONS

Aucouturier, J. et al., , "Scaling Up Music Playlist Generation", IEEE, vol. 1, Aug. 26, 2002, pp. 105-108, XP010604317.

* cited by examiner

METHOD AND DEVICE FOR GENERATING A USER PROFILE ON THE BASIS OF PLAYLISTS

The present invention relates to a method of generating a user profile on a media device which has obtained a set of playlists.

Furthermore, another aspect of the present invention relates to the generation of recommended playlists.

The present invention also relates to a computer system and a computer program product for performing the method.

Additionally, the present invention relates to a media device on which said method can be executed.

US 2002/0040326 discloses a method that is provided for selecting categorized content items for download to a mobile device. The method monitors presentation, playback and visual presentation of content items on said mobile device. The content items are items of any media type (e.g. MP3) downloadable to said mobile device as a data stream.

It is known in the art to use user preferences, e.g. in the form of a corresponding user profile, to recommend content to users. The content may be a song, a movie, etc. Said user preferences and user profile are quick functionality items to help the users to select or recommend content of preferred taste to them. Especially, said preferences and user profile relieve the user of the time-consuming task—when applied as a software tool or as an, added functionality on a media player, e.g. a CD player, a radio, a personal computer, etc.—of selecting appropriate media content among a huge amount of available content and thereby avoiding information overload, because the Internet, the broadcasting companies, record companies and the film industry provide an overwhelming and still increasing amount of various content, e.g. on the Internet and e.g. MP3 files as said content.

The task of obtaining user preferences in the previously known art is typically done by using two approaches: 1) explicitly asking the user to rate content, and/or 2) observing the actual usage of content, e.g. when content is played back.

However, a single playlist can typically only be used to express partial interests, e.g. one playlist represents interest(s) in rock content, another playlist represents interests in movie content, e.g. the interests in opera, whereas still another very different playlist represents interests in soap opera TV broadcasts, etc. In other words, a single playlist can be an incomplete and only a partial expression for a partial user interest in a dedicated content area, such as—in the above examples—rock content, opera movies and soap opera TV broadcasts, etc.

It is therefore a problem that a single playlist does not necessarily express or does not represent broad user interests in several and various content areas (actually preferred by its owner and user).

It is a further problem that the task of observing usage of content is rather unreliable, because a device that plays back content does not typically register who actually listens to and/or watches the content; further asking for explicit ratings on content being played back places an additional time-consuming burden (for giving a rating response) on the user.

A problem of current recommenders (that learn from examples) is that they do not efficiently analyze playlists composed by a user. The recommenders do not analyze how the playlists are made by a particular user. The known recommenders recommend individual items which may be combined into a playlist in a too simple manner, e.g. take best 10 items.

It is therefore an object of the present invention to provide an automated generation of a reliable user profile, which contains information about the user's preferences with respect to different playlist aspects. Another object is to solve the above-mentioned problems of the prior art. It is a further object of the present invention to determine user preferences on the basis of user playlist(s).

This is achieved by a method (and corresponding media device) of generating a user profile for a given user on a media device which has automatically obtained a first set of playlists comprising at least one playlist belonging to said given user, said method comprising the steps of:

analyzing said first set of playlists and deriving a number of playlist features expressing properties of the playlist; and generating the user profile based on said analyzed first set of playlists and said derived playlist features.

Advantageous embodiments according to the present invention are defined in the dependent claims.

Consequently and subsequently, the generated reliable user profile can be applied as a quick functionality item helping the user to select and/or be recommended preferred content on a given media device prior to a possibly subsequent playback of that preferred content.

It is an advantage of the present invention that more playlists and additional properties thereof are considered in the generation of the user profile, thereby forming and expressing a more complete user interest and a more reliable user profile.

Furthermore, it is an advantage of the invention that the process (i.e. said method) is automated and that it uses known information, i.e. already obtained playlists. Since users typically spend a lot of time and effort to manually create playlists of songs or other content they like, preference information provided by these playlists most likely has a high quality.

Additionally, it is an advantage that said method can be implemented in a system, into a media device and/or as software program that automatically searches for playlists. Said system, media device and/or program can then perform an analysis of these playlists in order to generate said user profile.

Aspects taken into account are preferably frequency of occurrence, creation date of the playlist, and relation between content items (songs, video, etc.) in one or more playlists.

As an extension, said system, media device and/or the program can distinguish between manually created playlists and commercial playlists (i.e. albums), e.g. by checking for existence of a playlist on the Internet, or by tagging a playlist during manual creation.

It is an additional advantage of the invention that no profiling efforts by users are required.

It is an additional advantage of the invention that already created playlists are used, because the quality of information is expected to be high and higher than playback observations known in the art.

Said computer system and media device, respectively, provide the same advantages and solve the same problem(s) for the same reasons as described previously in relation to the method.

The invention will be explained more fully below in connection with preferred embodiments and with reference to the drawings, in which:

FIG. 1 shows a method of generating a user profile on a media device having playlists. Said media device may be a jukebox, a set-top box, a TV, a PC, a DVD player, a radio, a VCR and/or the like on which content from a playlist and/or recommended content from the user profile can be played back.

Figure 1:
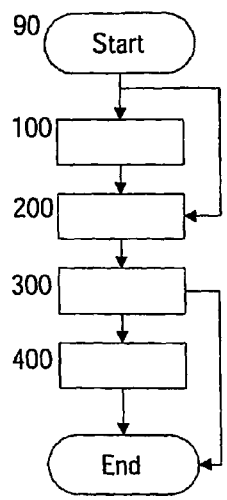
FIG. 1 shows a method of generating a user profile on a media device having playlists.

A playlist is an ordered list of e.g. musical pieces (songs). It may comprise other content as well or instead e.g. pictorial pieces (video).

A song is an audio fragment with metadata attached to or embedded in it (for instance, an MP3-file with a header containing information about the song).

Correspondingly, a video is comprised of picture fragments (e.g. MPEG frames) with corresponding metadata attached to or embedded in them (for instance, an MPEG-file having a header that comprises various information items about the video).

Music metadata describes song features. Typical song features are
nominal features such as song title and artist.
categorical or numerical features such as genre, tempo and release year.
Also low-level signal properties, extracted automatically from the audio signal, can be used.

Correspondingly, metadata describing video features for the video movie is similarly possible.

The following description will primarily focus on playlists comprising an ordered list of songs; however, it should be kept in mind that the description is intended to also cover playlists comprising an ordered list of videos, photos, etc.

A short playlist could be like this:

| Index | ID | Title | Artist | Genre | Tempo (bpm) | Release year |
|---|---|---|---|---|---|---|
| 1 | 123 | The Winner Takes It All | ABBA | Pop | 124 | 1979 |
| 2 | 435 | The Sign | Ace Of Base | Pop | 110 | 1993 |
| 3 | 453 | Black Velvet | Allanah Myles | Rock | 91 | 1990 |
| 4 | 256 | The Final Countdown | Europe | Rock | 132 | 1986 |
| 5 | 129 | Summer of '69 | Bryan Adams | Rock | 140 | 1984 |

Corresponding indices, IDs, titles, artists, genres, tempo, release years, etc. can be discussed for playlists comprising movie or movie-clips, etc.

Before the method is applied, it is assumed that playlists (i.e. a second set of playlists) are already obtained and residing on the media device. However, these (said second set of playlists) may have been obtained by different users (first case), which is the reason for step 100 where playlists belonging to a given single user (i.e. a first set of playlists) is determined. If only a single user has obtained playlists (second case), said first and second set of playlists will be equal and step 100 is not necessary. In step 100, the issue of obtaining playlists of a particular user is resolved in both cases.

In step 100, the media device will search for a first set of playlists among said second set of playlists. As a result, said first set of playlists belongs only to the particular user. Said first set of playlists can be isolated as files in and from one or more specified user directories, i.e. these files (playlists) are tagged, have a property (of the user) and/or have other identifying information indicating said particular user only.

If more than one user originally obtained playlists (the first case), said first set of playlists will be a subset of said second set of playlists, in all cases, said first set of playlists will only belong to the particular user.

As mentioned, step 100 is not necessary, when said second set of playlists is in fact equal to said first set of playlists (the second case), i.e. when said sets of playlists belong to the same and only creator, owner or user. In this case, said first set of playlists is equal to the playlists stored on the media device, thus there is no need to deal with different sets.

In any case, with the obtained first set of playlists belonging to the particular user, the method proceeds to step 200.

In step 200, said first set of playlists is analyzed. The analysis can be performed in various ways as described hereinafter.

Generally, whether a user likes a playlist depends on
1) the songs in the playlist,
2) the combination of songs in the playlist and the variation in the playlist, and
3) the order of the songs in the playlist.

Based on the features of the songs in a playlist, playlist features can be constructed by expressing properties of the whole list rather than on an individual song.

For example:
Tempo variance
Number of different artists

Also based on the song features, transition features can be constructed, expressing properties of the song transitions that occur in the playlist(s).

For example, for the transition between song 1 and song 2:
Relative tempo difference: [tempo (song 2)–tempo (song 1)]/tempo (song1)
Genre change: false, if genre (song1)=genre (song2), true otherwise.

In other words, the result of the analysis can result in various parameters derived from playlists, i.e. tempo variance, number of different artists, relative tempo difference, one or more preferred genres, number of genre changes, a particular genre change (between two songs) being true, the genre change (between two other songs) being false, and the number of true and false genre changes between songs.

In step 300, the user profile is generated. It is based on said analyzed first set of playlists and their actual application, i.e. actual use. The generation of the user profile can be performed in various ways as described hereinafter.

A user's preference (appreciation) for a playlist or playlists can be expressed in terms of song features, playlist features and transition features.

A user profile preferably comprises examples of songs, transitions and playlists the user likes or dislikes and is therefore composed of these in the generation in this step of the method. An example either falls in the preference class "+" (i.e. like) or in the preference class "−" (i.e. dislike). Alternatively, a preference range could be used, for example on a 1 to 5 scale, where 1 means 'dislike very much' and 5 means 'like very much'.

The preference examples are obtained from the edit and playback actions the user performs or performed on his playlists, i.e. said first set of playlists and its actual application during use.

For example, the application of a playlist can be skipping of a certain song when listening to the playlist whereby the user in fact generates a negative song example (dislike of this certain song), which is added to his user profile. Positive examples (of application and use of playlists) are obtained from playlists created manually by the user. These provide examples of songs and transitions that are liked and the level of variation that is preferred by the user.

Basically, the user profile may thus comprise three collections:

a collection of songs the user likes or dislikes,
a collection of transitions the user likes or dislikes, and
a collection of playlists the user likes or dislikes.

Timestamps are preferably added to be able to remove preference examples eventually, as people's music preferences may change over time. Also, the timestamp can be used to weight examples in preference prediction, giving older examples a lower weight, giving newer examples a higher weight, etc.

For example, a fragment of the collection of song examples could be like this:

| Song-id | Preference class | Timestamp |
|---|---|---|
| 256 | +(like) | 02-03-2003, 12:10 |
| 476 | −(dislike) | 17-03-2003, 10.31 |
| 129 | +(like) | 03-04-2003, 13:40 |

Said Song-id corresponds to the previously defined "ID".

Since features have been attributed to the elements of each of the three collections, the user's preferences can be expressed in terms of these features (generalization) and a preference prediction for a new playlist can be made.

Based on the collections of examples, characteristics of the preference classes (the positive class and the negative class) can be found, for example by determining statistics such as the following.

Positive Song Examples:

| Genre: | Percentage of Rock = | 53 |
|---|---|---|
| | Percentage of Pop = | 32 |
| | Percentage of Other = | 15 |
| Tempo: | mean = 80, | variance = 32 |
| Release year: | mean = 1985, | variance = 21 |

And so on.

There are corresponding analogous examples for negative song examples.

Positive Transition Examples:

| Genre changes: | |
|---|---|
| Percentage of true = | 37 |
| Percentage of false = | 63 |

Relative tempo dif.: mean=5, variance=0.5
And so on.

Correspondingly, there are analogous examples for negative transition examples.

Positive Playlist Examples:

| Number of different artists: | mean = 10, variance = 7 |
|---|---|
| Tempo variance: | mean = 20, variance = 14 |

And so on.

There are corresponding analogous examples for negative transition examples.

In this way, the user profile comprises counts, sums, etc. and/or percentages of categorical song metadata of playlists, and means and/or variances of numerical song metadata of playlists.

Furthermore, a probabilistic approach may be used instead or in connection with the above, where the feature values of the playlist under evaluation are compared to feature values that occur in the example collections. For example, assume that all positive song examples in the user profile correspond to songs released in the 1980s. Then, if a song in a new playlist has 1958 as release year, it is very unlikely that this song will be preferred, considering this feature. A song from 1975 would be more likely and a song from 1985 would be very likely.

Preference probabilities (likelihoods) can be determined for all features of all songs and transitions in a playlist, as well as for the playlist features. A (e.g. weighted) product of all these probabilities yields an overall probability of the playlist being preferred by the user. This probability can be used as a preference prediction on a 0 to 1 scale. To construct a recommended playlist, one tries to construct a playlist for which this prediction is maximal. As another alternative, Bayesian analysis and recommendation may be used. Bayesian analysis/logic relates to using previous probabilities/outcome to (better) predict future probabilities/outcome.

Furthermore, other (non-probabilistic) approaches to create preference predictions for playlists based on feature values found in the example collections are also possible. Also, various choices can be made for the features that are included.

These characteristics form a condensed user profile, which will be used to predict the user's preference for new playlists and to generate new recommended playlists in the next step. Similar discussions—as compared to playlists comprising songs—are possible for playlists comprising videos, video clips or other playable content items, i.e. the user profile may as well be based on an analysis of playlists comprising an ordered list of videos (video clips or other playable content items) as well with a subsequent generation of a user profile (regarding videos, etc.).

As a result of the above steps, the user profile is established and can then be applied as a quick functionality item (in said media device) to its user to select or to recommend content items (if available) of preferred taste to him or her. The user profile then relieves him of the task of selecting appropriate content items from a huge amount of content available, e.g. on and from the Internet, previously stored on his media device, from a computer-readable medium, such as a CD, a DVD, etc.

In other words, content items may be recommended on the basis of the automatically generated user profile, when available content items closely match what is recommended from the user profile, e.g. the same or most similar content items, e.g. having the same or most similar genre, tempo, positive preference class, etc. should then be recommended when available on and from said media device.

The method may additionally comprise step 400.

In step 400, recommended playlists are generated on the basis of said user profile.

As described previously, said characteristics form a condensed user profile. This can subsequently be used according to the present invention to predict the user's preference for new playlists and to generate new recommended playlists.

Correspondingly, statistical measures, such as tempo variance, relative tempo variance, mean values, standard deviation can be applied to construct or generate one or more recommended playlists from the user-generated profile of step 300. Consequently, the newly generated playlists may have the same structure as the playlists referred to in steps 100 through 300. In this way, variety and coherence can be taken into account.

Furthermore, other aspects can be taken in account, especially transitions between items in a playlist.

In other words, according to an aspect of the invention in the present step, it is to learn from the user preferences (like, dislike, etc.) so that—as an end result—recommended playlists are generated.

Figure 2:
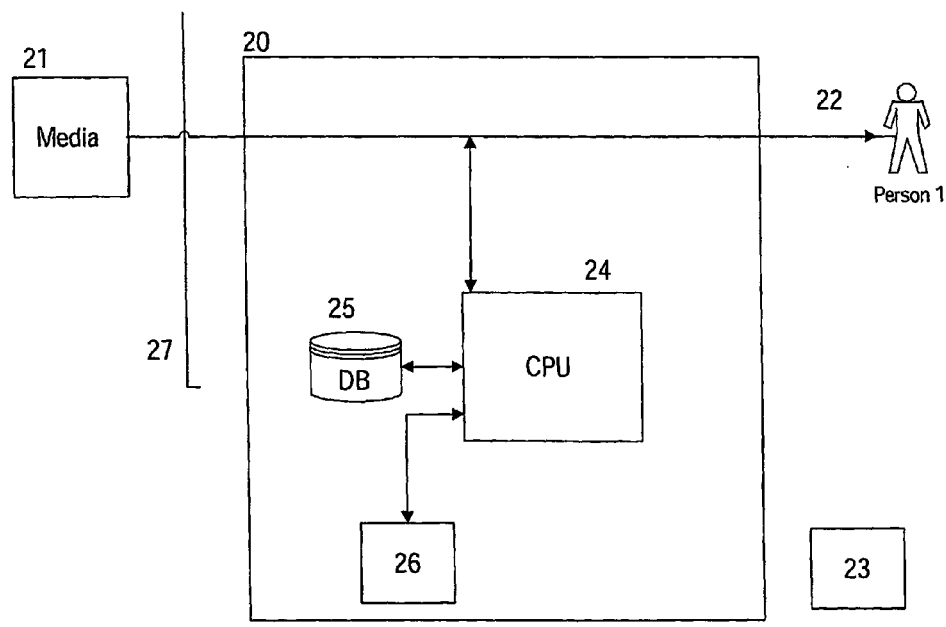
FIG. 2 shows a media device generating and applying the user profile and a computer-readable medium.

FIG. 2 shows a media device generating and applying the user profile and a computer-readable medium. The media device implements the method of FIG. 1. Reference numeral 20 denotes the media device, and reference numeral 23 denotes a computer-readable medium on which said method comprised of the program code may be stored.

The media device (20) may e.g. be a jukebox, a set-top box, a TV, a PC, a (e.g. portable) hard disk recorder, a solid-state device, a DVD player, a radio, a VCR or the like, where the media device (20) can take advantage of the generated user profile and the generated new playlists according to the present invention. Further shown is a media provider (21) providing content items, e.g. videos or songs, etc. Reference numeral 21 may denote more than one media provider. Content items may be a live content like a TV program, a video available to be seen on demand, an interactive live broadcast TV on the Internet, Internet TV, Internet sites, a movie, radio broadcasts (e.g. a song) or any other content which can be watched and/or listened to, and the content can possibly be stored subsequently, i.e. recorded on a data medium suitable for later playback and presentation on said media device. In more technical terms, content items comprise, for example, one or more selected from the group of:

- a DVD MPEG Program Stream containing picture and sound signal;
- a Blu-Ray MPEG Transport Stream containing picture and sound signal;
- a CD sound signal
- a given digital audio format (e.g. MP3, WMA, Real Audio, WAV, etc.);
- a given digital movie format (e.g. DivX, DVD/MPEG2, Avi, wmf, MOV, Real Video, etc.);
- a given picture format (e.g. JPEG, GIF, BMP, TIFF, etc.); and/or
- any such format that is capable of causing the device to emit a picture, and/or sound signal, e.g. G72x, aiff, real.

Typically, a content item is contained in a file and more content items can be listed e.g. in a playlist.

Reference numeral 24 denotes one or more CPUs or the processing power of the media device (20). The CPU(s) may update a database or memory (25) with modified or retrieved playlist(s) and a generated user profile according to the present invention for later retrieval and use.

Generally, the media device (20) may be a device that can present (i.e. playback and/or show) said content items. Content items may be selected or recommended from a playlist or from the generated user profile according to the invention, prior to being played back.

The media device (20) may further comprise input means (26) being in connection with the CPU(S) (24) for receiving/registering responses of various user inputs. The input means (26) may e.g. be a keyboard, a mouse, a remote control, an interactive menu with clicks on an onscreen menu, a joystick, simple push button, by means of selections on a graphical user interface, etc. The input means (26) may e.g. be used to compose various playlists, to tag the playlist during manual creation, to initiate playback from playlists or play back content suggested and/or recommended from the generated user profile according to the invention.

Additionally, user input may be used to retrieve and/or manipulate playlists and/or the generated user profile according to the invention.

Reference numeral 22 denotes one or more users of the media device. The user or users may watch and/or listen to the recommended content item, when selected.

Reference numeral 27 illustrates a user connection point to the media provider (21). It may be an antenna outlet for TV or radio, a modem or ADSL connection or a similar connection to the Internet, an antenna outlet from a satellite receiver, a SCART connection to a TV and or to a VCR, a Bluetooth or IR interface, etc. Predefined or commercial playlists may further be retrieved from said user connection point.

A computer-readable medium may be a magnetic tape, an optical disc, a digital versatile disk (DVD), a compact disc (CD recordable or CD writeable), a mini-disc, a hard disk, a floppy disk, a smart card, a PCMCIA card, etc.

In the claims, any reference signs placed between parentheses shall not be constructed as limiting the claim. Use of the verb "comprise" and its conjugations does not exclude the presence of elements or steps other than those stated in a claim. Use of the indefinite article "a" or "an" preceding an element or step does not exclude the presence of a plurality of such elements or steps.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of generating a user profile for a given user from at least one first playlist including a first sequence of content and being associated with the given user and stored on a media device, said method comprising:
   automatically searching for the at least one first playlist among a plurality of playlists, wherein the plurality of playlists includes at least one of a second playlist and a third playlist, wherein the second playlist has a second sequence of content and is associated with a different user and the third playlist has a third sequence of content and is associated with the given user, and each playlist of the plurality of playlists including at least one identifying characteristic of content stored on the media device;
   analyzing the at least one first playlist and automatically deriving from the at least one analyzed first playlist at least one playlist feature expressing at least one property of the at least one first playlist, the at least one playlist feature comprising an occurrence frequency or at least a content relationship of the plurality of playlists; and
   automatically generating a user profile for the given user based on the analyzed at least one first playlist and the derived at least one playlist feature;
   wherein at least one of the said searching, analyzing, and generating comprises use of computerized hardware including a processing element.

2. The method as claimed in claim 1, wherein the at least one playlist feature comprises one or more of:
   a feature representing tempo variance,
   a feature representing a number of different artists,
   a feature representing relative tempo difference,
   one or more features representing one or more preferred genres,
   a feature representing a number of genre changes,
   a feature representing the presence or absence of a particular genre change, and
   a feature representing the number of true and false genre changes between songs.

3. The method as claimed in claim 1, said method further comprising generating at least one recommended playlist on the basis of said user profile.

4. The method as claimed in claim 3, wherein said generating of at least one recommended playlist comprises use of a Bayesian analysis and recommendation method.

5. The method as claimed in claim 1, wherein the at least one first playlist comprises an ordered list of content items, including songs or videos, and the content items include metadata.

6. The method as claimed in claim 5, wherein the metadata comprises title, artist, genre, tempo and release year.

7. The method as claimed in claim 1, wherein the generated user profile comprises collections of examples of content items, including at least one of: songs or videos, liked and/or disliked by the user, collections of transitions liked and/or disliked by the user and collections of playlists liked and/or disliked by the user.

8. The method as claimed in claim 1, wherein the user profile further comprises at least one of: counts and/or percentages of categorical content-metadata in playlists, and variances of numerical content-metadata in playlists.

9. The method as claimed in claim 1, wherein the media device is a jukebox, a set-top box, a TV, a PC, a DVD player, a hard disk recorder, a solid-state device, a radio or a VCR.

10. The method as claimed in claim 1, wherein the at least one first playlist comprises one or more selected from the group of:
 a DVD MPEG Program Stream containing picture and sound signal;
 a Blu-Ray MPEG Transport Stream containing picture and sound signal;
 a CD sound signal;
 a given digital audio format;
 a given digital movie format;
 a given picture format; and/or
 any format capable of causing said media device to emit a picture signal and/or a sound signal.

11. A media device for generating a user profile for a given user from at least one first playlist including a first sequence of content and being associated with the given user and stored on the media device, the media device comprising:
 a searching element adapted to automatically search for at least one first playlist associated with the given user among a plurality of playlists, wherein the plurality of playlists includes at least one of a second playlist and a third playlist, wherein the second playlist has a second sequence of content and is associated with a different user and the third playlist has a third sequence of content and is associated with the given user, and each playlist of the plurality of playlists including at least one identifying characteristic of content stored on the media device;
 an analyzing element adapted to analyze the at least one firstplay list and automatically derive from the at least one analyzed first playlist at least one playlist feature expressing at least one property of the at least one first playlist, the at least one playlist feature comprising an occurrence frequency or at least a content relationship of the plurality of playlists; and
 a generating element adapted to automatically generate the user profile based on the analyzed at least one first playlist and the derived at least one playlist feature.

12. A non-transitory computer readable medium embodying a computer program product comprising program code for performing the method of claim 1 when the computer program is run on a computer.

13. The method of claim 1, further comprising distinguishing between manually created playlists and commercially available playlists.

14. The method of claim 13, wherein the distinguishing is performed by checking for existence of a playlist on the Internet, or by tagging a playlist during manual creation of the playlists.

15. The media device of claim 11, further comprising distinguishing between manually created playlists and commercially available playlists.

16. The media device of claim 15, wherein the analyzing element checks for existence of a playlist on the Internet, or tags a playlist during manual creation.

17. The media device of claim 11, wherein the searching element, the analyzing element, and the generating element are embodied in computerized hardware including a processing element.

18. The method of claim 1, wherein the at least one first playlist comprises a plurality of digital media files.

19. The method of claim 13, wherein the distinguishing is performed by checking for existence of a playlist on the Internet.

* * * * *